(12) United States Patent
Hasse (10) Patent No.: US 6,196,811 B1
(45) Date of Patent: Mar. 6, 2001

(54) CONTRACTION MACHINE

(75) Inventor: Hans-Helmut Hasse, Stadthagen (DE)

(73) Assignee: Hasse High Pressure Engineering, Stadthagen (DE)

( * ) Notice: Subject to any disclaimer, the term of this patent is extended or adjusted under 35 U.S.C. 154(b) by 0 days.

(21) Appl. No.: 09/310,582

(22) Filed: May 12, 1999

Related U.S. Application Data (63) Continuation of application No. PCT/EP97/06210, filed on Nov. 8, 1997.

(30) Foreign Application Priority Data

Nov. 13, 1996 (DE) .............................. 196 46 887

(51) Int. Cl.⁷ .................................................. F01B 23/08
(52) U.S. Cl. .......................................................... 417/321
(58) Field of Search ............................................. 417/321

(56) References Cited

U.S. PATENT DOCUMENTS

| | | | |
|---|---|---|---|
| 3,986,354 | * 10/1976 | Erb | 417/321 |
| 3,994,132 | 11/1976 | Jackson . | |
| 4,150,544 | 4/1979 | Pachter . | |
| 4,186,558 | 2/1980 | Kuo . | |
| 4,448,027 | 5/1984 | Hsu . | |
| 4,584,842 | * 4/1986 | Tchernev | 62/2 |
| 5,622,482 | * 4/1997 | Lee | 417/321 |

FOREIGN PATENT DOCUMENTS

| | | |
|---|---|---|
| 709 701 | 7/1941 | (DE) . |
| 28 57 109 | 12/1980 | (DE) . |
| 30 26 864 | 2/1982 | (DE) . |
| 33 36 406 | 4/1984 | (DE) . |
| 1543115 | * 2/1990 | (SU) .................................. 417/321 |

OTHER PUBLICATIONS

Weka Praxishandbuch/Neue Konstruktionsmöglichkeiten Mit Kunststoffen Durch Schnelle Und Sichere Werkstoffauswahl, Chapter 8, pp. 208, 209, 189, and 328, Table of Contents for vols. 1–5, Fachverlag für technische Führungskräfte, Augsburg, Germany, Oct. 1996.

Kunststoff–Taschenbuch, Pabst, Franz, et al., title page, unnumbered page indicating sections of handbook, p. 433, 436–439, 442–445, Carl Hanser Verlag, München [Munich], 26ᵗʰ Edition, 1995, ISBN 3–446–17855–4.

Kunstostoff–Lexikon, Brandrup, J., et al., pp. 426–429, Carl Hanser Verlag, München [Munich], ISBN 3–446–15176–1, 1992.

* cited by examiner

*Primary Examiner*—Charles G. Freay
(74) *Attorney, Agent, or Firm*—Shlesinger, Arkwright & Garvey LLP (57) ABSTRACT

The invention concerns a contraction engine or pump comprising two mutually spaced rigid elements (4, 6) connected to each other by at least one piston/cylinder system (8, 10) receiving an operational medium and of which at least one element is displaceable in the direction of motion of the piston/cylinder system. At least one expansible and contractile operational element (11) is connected to the two elements (4, 6) and is operationally connected with a fitting for liquid intake and exhaust and/or water vapor intake and exhaust and which will expand in the case of liquid and/or water vapor intake and will contract in the case of liquid exhaust and/or water vapor reduction. The cylinder (8) is connected to intake and exhaust conduits (12, 14) for the operational medium.

15 Claims, 7 Drawing Sheets

CONTRACTION MACHINE

CROSS REFERENCE TO RELATES APPLICATIONS

This application is a continuation of application Ser. No. PCT/EP97/06210, filed Nov. 8, 1997, which application claims the priority of German Application No. 196 46 887.6, filed Nov. 13, 1996.

BACKGROUND OF THE INVENTION

The invention relates to a contraction machine, hereafter contraction engine, pump or pump system including two(2) rigid spaced apart elements mutually connected by at least one piston/cylinder system, which piston/cylinder system receives an operational medium. At least one of the spaced apart elements being displaceably mounted in the direction of displacement of the piston/cylinder system.

The German patent 30 26 864 describes an evaporation machine, using the power of expansion of an expanding material when liquid is being added, as mechanical energy. The known evaporation engine comprises a vessel containing expansion elements, conduit fittings and the work-performing medium enclosing the expanding elements. Water and air are alternatingly fed through valves to the expanding elements. The water flows cyclically into the expanding elements through the conduit fittings and the through the valve. The expanding elements expand and transmit pressure and an increase in volume to the work-performing medium being guided through the conduit fitting and through the valve in order to do work. While this known evaporation engine can make use of both the heat in the ambient air and waste heat, the cost of drying the expanding material on the other hand is comparatively high.

The German patent 28 57 109 discloses an engine equipped with contractile, ion-separating means. These means are folded plates rigidly suspended at one end to a stationary, rigid power supply and connected at the other end to a displaceable network. An ion-rich liquid and an ion-poor liquid are alternatingly made to pass over the plates which thereby alternatingly contract and expand. This alternating power of contraction and expansion is transmitted to a mechanically displaceable element. Because the plates are affixed, they disadvantageously require guidance.

The German patent 709 701 discloses apparatus generating mechanical energy using a revolving belt made of a swellable material and by evaporating a liquid.

Apparatus generating mechanical power are known from U.S. Pat. No. 4,150,544 comprising revolving belts of which one part is heated while the other part is cooled.

German patent 33 36 406 discloses apparatus generating mechanical heat from heat, wherein a liquid is pumped to-and-for between deforming and hence volume-variable hollow spheres.

U.S. Pat. No. 4,186,558 concerns an engine converting thermal into mechanical energy by periodically freezing and melting a liquid in a cylinder.

OBJECTS AND SUMMARY OF THE INVENTION

The objective of the present invention is to create an improved contraction engine of the initially cited kind having improved, more compact design and higher efficiency.

This problem is solved by the invention.

Solutions include the inventive contraction engine, pump or pump system including two(2) rigid spaced apart elements mutually connected by at least one piston/cylinder system, which piston/cylinder system receives an operational medium. At least one of the spaced apart elements being displaceably mounted in the direction of displacement of the piston/cylinder system.

At least one operational element is mounted between and connected to the two(2) rigid spaced apart elements. The operational element is operatively connected to the fitting for the intake and exhaust of a liquid. The fitting may likewise intake and/or exhaust water vapor. The at least one operational element expands upon intake of liquid and/or water vapor and the at least one operational element contracts upon exhaust of liquid and/or water vapor. When the at least one operational element contracts it implements a power stroke. There are intake and exhaust conduits for the operational medium which is in the piston/cylinder system and that are connected to the respective cylinder(s) of the piston/cylinder system.

Further inventive solutions include the provision of the rigid elements in the form of plates, plaiting, fabric material or grids or lattices.

The inventive expansible and contractile operational element may be in the form of strands, fibers, folded plates, coils or fiber coils.

The inventive contraction engine may include a spherical shell (41) or a closed cylindrical shell (52) of which the casings (42) consist of an expansible and contractile material and are lined on the inside with an impermeable, elastic, inert sleeve (43) and which are filled with an operational medium (44). This operational medium communicates through a connection conduit (45) mounted in and sealed from the casing to an intake and exhaust conduit (46, 47) of the operational medium, and is operationally connected with a fitting for the intake and exhaust of liquid and/or intake and exhaust of water vapor. The shells expand upon receiving liquid and/or water vapor and contract upon exhaust of liquid and/or reduction of water vapor and thereby implement a power stroke during contraction.

The contraction engine may include an expansible and contractile endless belt (62) guided around two rotatable rollers (63, 64) each set in the same direction of rotation by a one-way directional device (65, 66). Each of the belt segments (67, 68) is alternatingly moistened (70) and dried (72) between the rollers, the moistening to expand one belt segment (67 or 68) and the drying to contract the other belt segment (68 or 67) always being simultaneous. The contraction of the belt segment thus being used to generate mechanical energy.

Mere ambient heat suffices to operate the contraction engines of the invention and accordingly they are advantageously used in dry and hot climates which allow generating practically continuously power without resort to non-solar energy.

A piston/cylinder system of the invention between the plates connected by the operational elements allows great compactness; at the same time this configuration allows automatic plate guidance.

The invention is elucidated below in relation to the attached drawing showing illustrative embodiments.

DETAILED DESCRIPTION OF THE INVENTION

In these Figures, identical components are denoted by the identical references.

Figure 1:
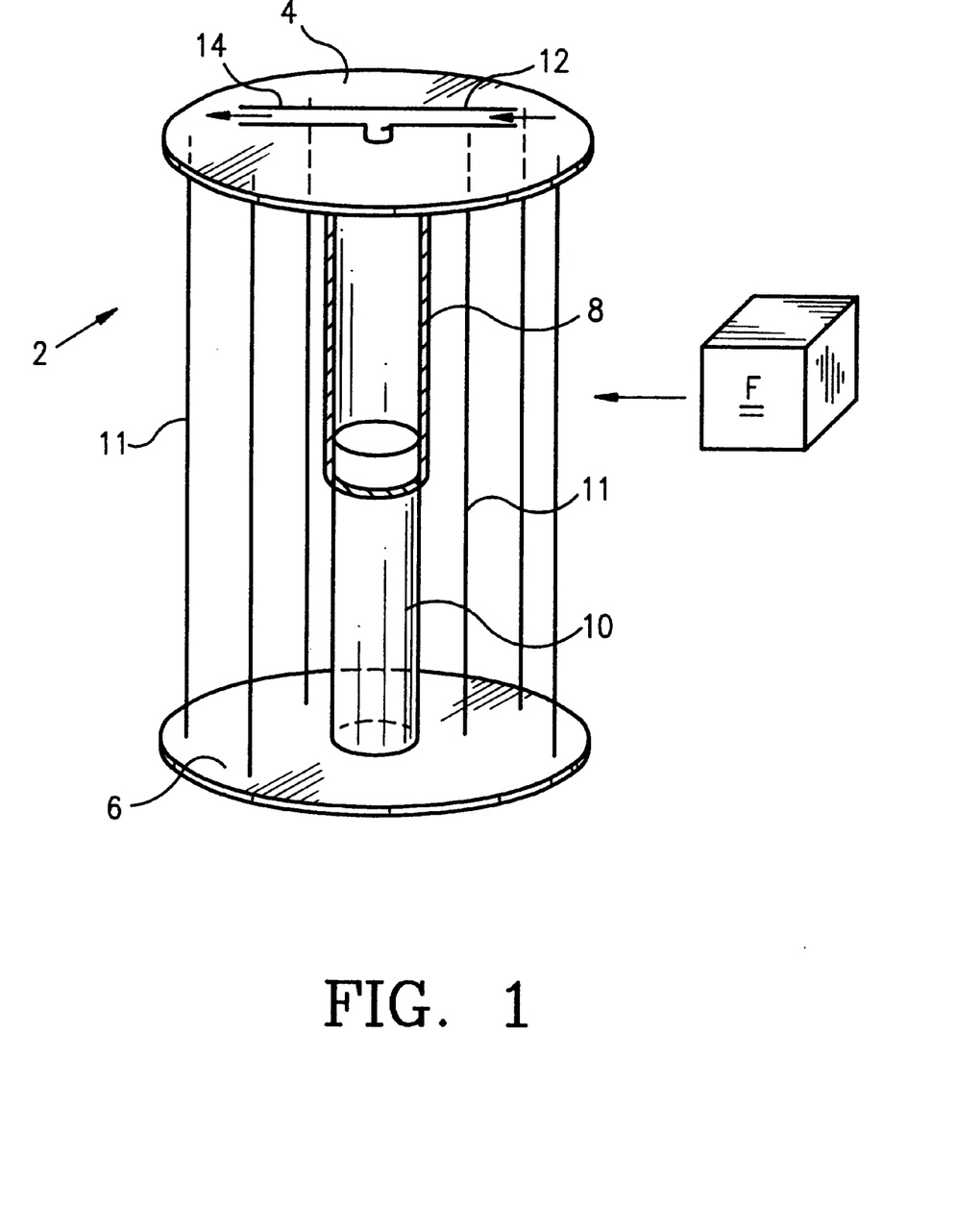
FIG. 1 schematically shows a first embodiment of a contraction engine with an operational cylinder, FIG. 2 schematically shows a second embodiment of a contraction engine with an operational cylinder.

FIG. 1 shows the functional design of a contraction engine 2. The contraction engine 2 comprises two mutually spaced, warp-resistant plates 4 and 6 joined to each other by a central cylinder/piston system 8, 10, either or both plates being displaceable. Expansible and contractile operational elements, for instance strands 11, moreover are mounted between the two plates 4, 6.

An operational medium is present within the cylinder 8 and is able to flow in and out through intake and exhaust fittings 12, 14. The intake and exhaust conduits 12, 14 preferably are integrated in the plates 4 at the cylinder side.

At the same time the cylinder/piston system 8, 10 acts as a guide for the plates and accordingly no further guide elements are needed.

Figure 2:
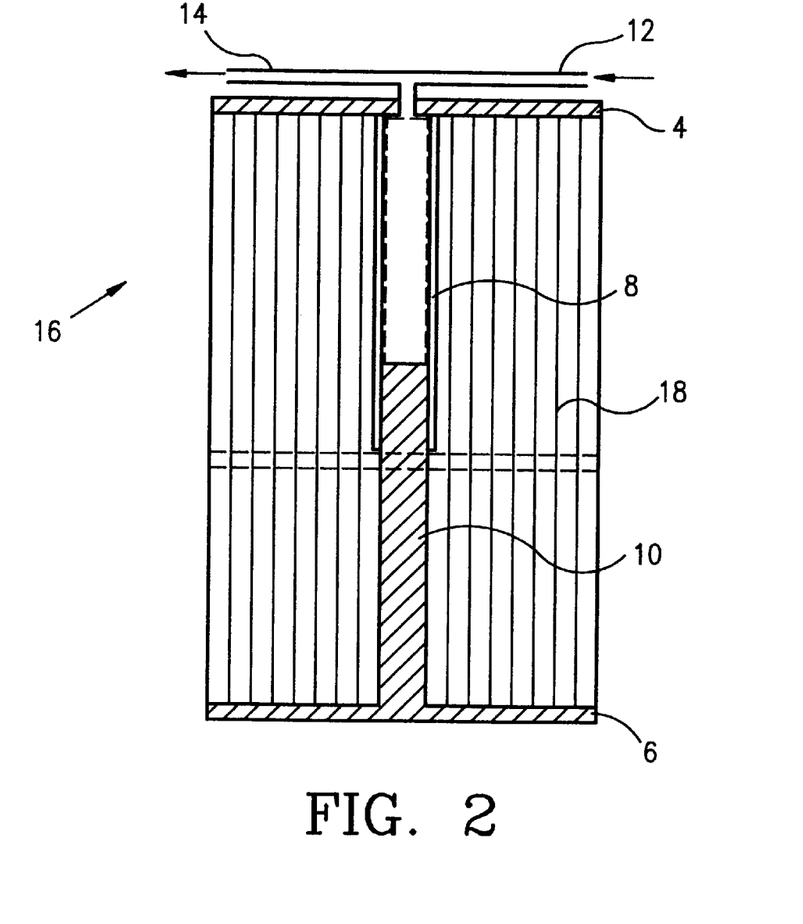
Figure 2A:
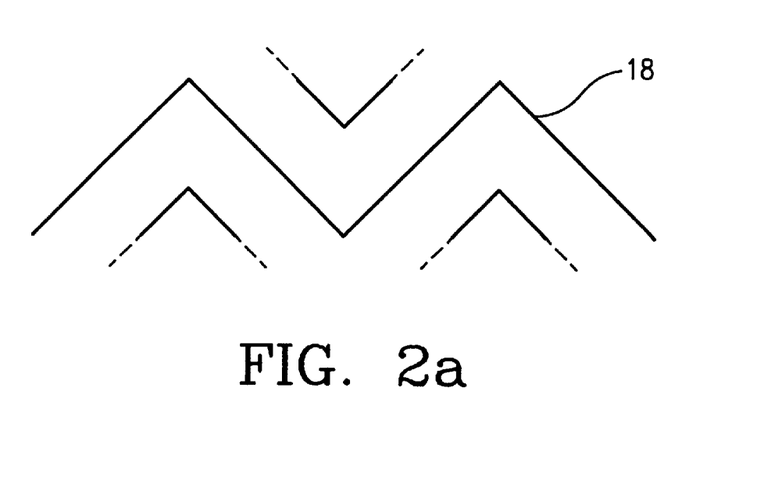
FIG. 2a is part of a topview of the expansible and contractile plates used in the contraction engine of FIG. 2, FIG. 3 schematically shows a perspective of a third embodiment of a contraction engine with several operational cylinders, FIG. 4 schematically shows a fourth embodiment of a contraction engine, FIG. 5 schematically shows a fifth embodiment of a contraction engine, FIG. 6 schematically shows a sixth embodiment of a contraction engine, FIG. 7 schematically shows a further preferred embodiment, similar to FIG. 1, and FIG. 8 schematically shows an operational element in the form of a coil.

FIG. 2 shows a contraction engine 16 differing from that of FIG. 1 in that, instead of expansible and contractile strands, expansible and contractile folded plates 18 (FIG. 2a) are mounted between the two mutually spaced, warp-resistant plates 4 and 6, of which one is displaceable, and which are connected by the cylinder/piston system 8, 10.

Again an operational medium is present inside the cylinder 8 and can flow in and out through the intake and exhaust fittings 12, 14. Preferably the intake and exhaust fittings 12, 14 are integrated into the plates 4 at the cylinder side. Simultaneously the piston/cylinder system 8, 10 guides the plates and no further guide means are needed.

Figure 3:
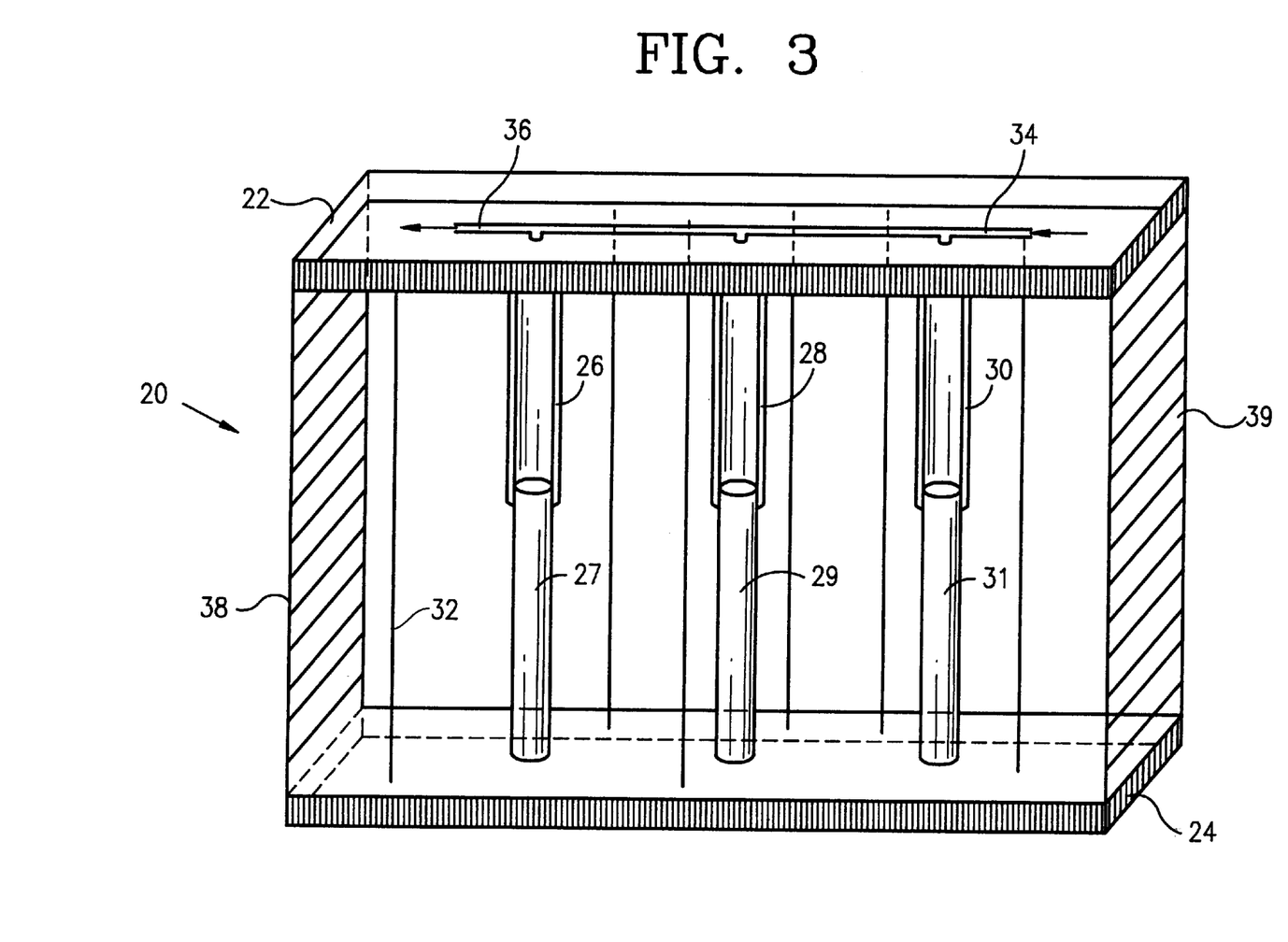

FIG. 3 shows a contraction engine 20 comprising two mutually spaced, warp-resistant rectangular plates 22, 24 between which are mounted several cylinder/piston systems 26, 27, 28, 29, 30, 31, for instance strands 32 or also folded plates as in the embodiment of FIG. 2. Either or both plates are displaceable.

The supply or exhaust of operational medium (for instance a hydraulic liquid) preferably is implemented through intake and exhaust conduits 34, 36 integrated into the plates 22 at the cylinder side.

The plates are situated between the side boundary walls 38, 39.

The contraction engines 2, 16 and 20 operate as follows: when the operational elements 11 and 32 and the folded plates 18 are alternatingly loaded by use of a fitting F with liquid, humidity or steam for expansion and are loaded with a means for liquid or humidity transfer or steam reduction for contraction, the alternatingly consecutive motions of expansion and contraction are transferred by the plates 4, 6 and 22, 24 to the piston/cylinder(s) carrying out a suction stroke on account of the increase in cylinder volume during the expansionary displacement, while operational medium flows through the intake fitting 12, 34 into the piston/cylinder system, and during the contraction displacement carrying out a power stroke while operational medium is expelled through the exhaust fitting 14, 36 and is used to perform mechanical work. FIGS. 1 through 3 show contraction engines in which the air for instance introduced to dry the operational elements can enter through optimal apertures allowing to substantially lower the cost of drying the operational elements.

Figure 4:
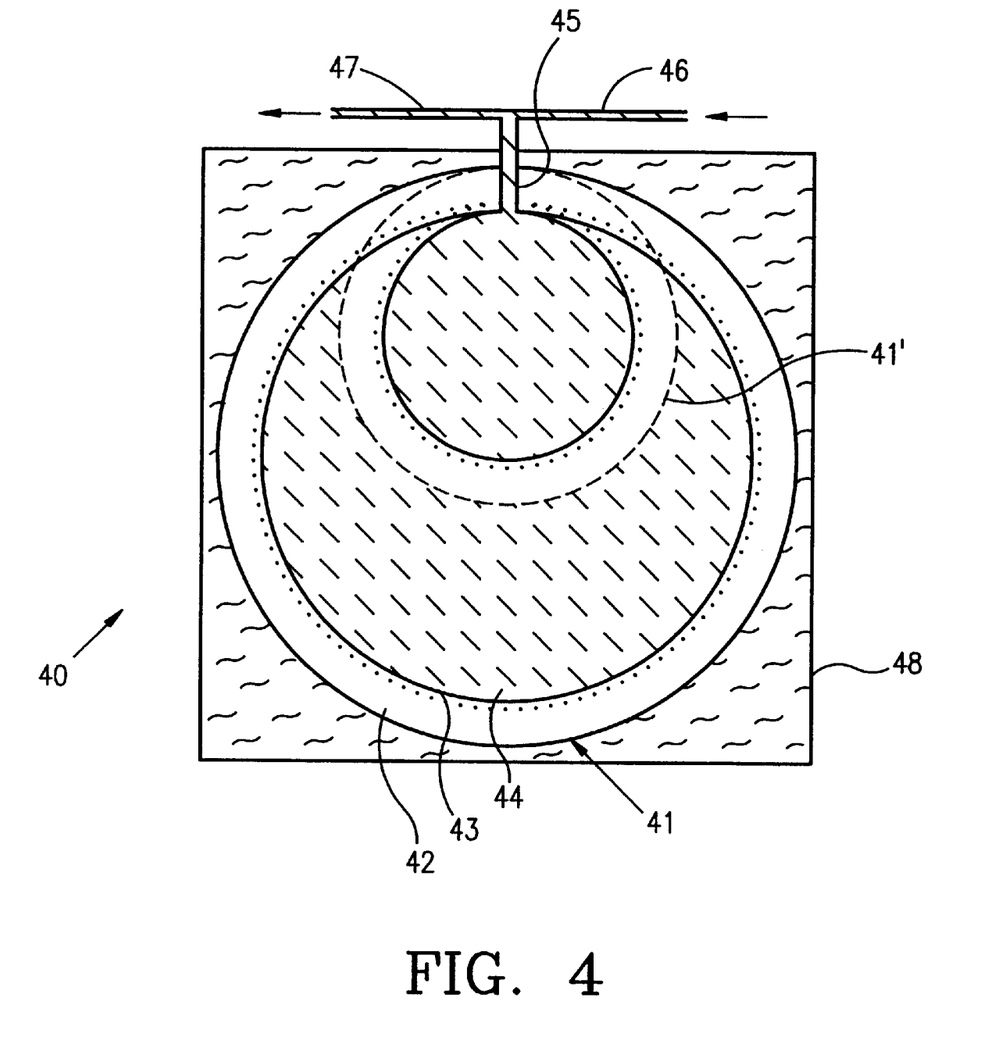

FIG. 4 shows a contraction engine 40 comprising a spherical shell 41 of which the outer skin 42 is composed of an expansible and contractile material and which is lined on its inside with an impermeable, elastic and inert sleeve 43 and filled with an operational medium 44. The operational medium 44 is connected through a conduit 45 sealed relative to the lining 42 to an intake and exhaust conduit 46, 47.

The expansible and contractile spherical shell 41 is located within a container 48. Liquid or water vapor is alternatingly fed to and removed from this container 48, though in a manner not elucidated herein nor intended to.

Figure 5:
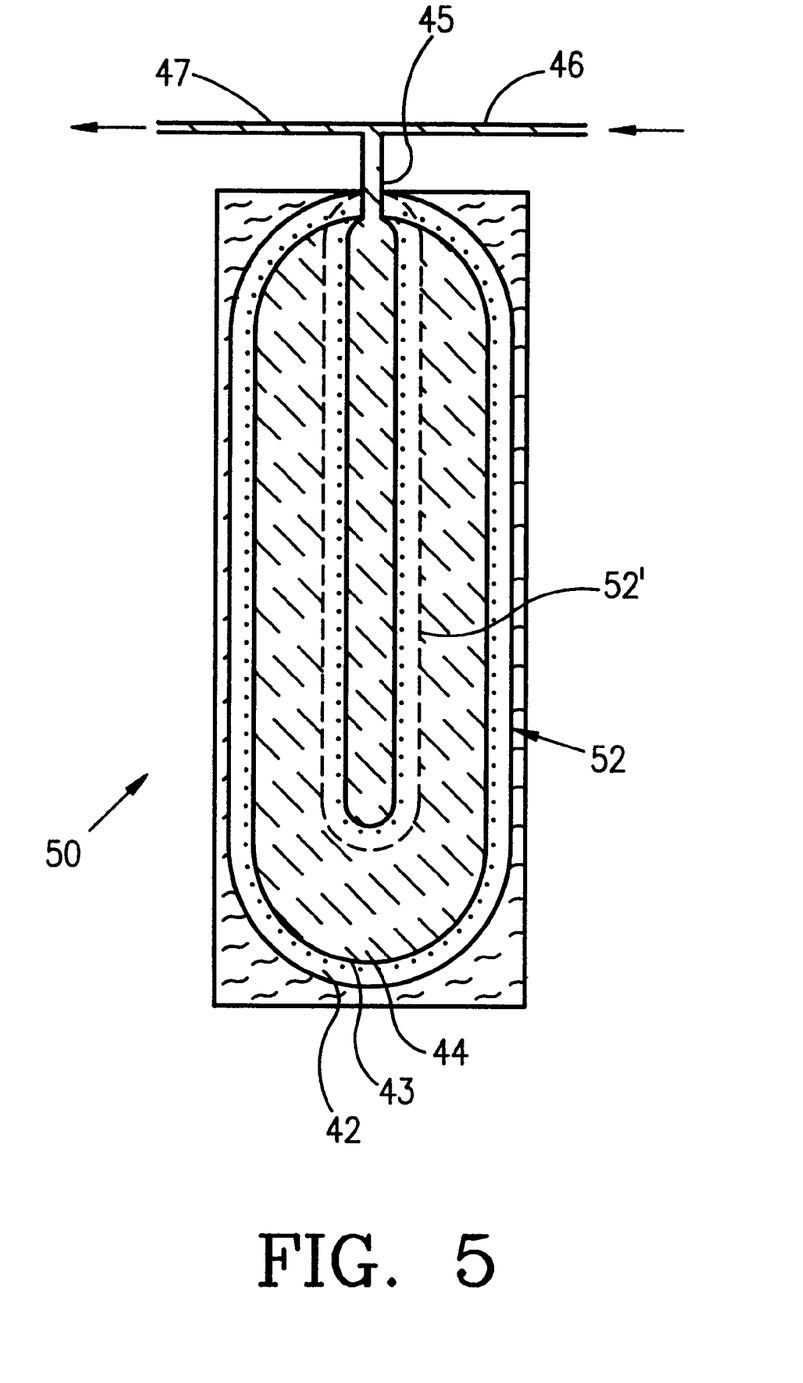

FIG. 5 shows a contraction engine 50 merely differing from the contraction engine 40 of FIG. 4 by using an expansible and contractile cylindrical shell 52 instead of a spherical shell 41. Otherwise the description relating to FIG. 4 applies; comparable components are denoted with the same references as in FIG. 4.

The contraction engines 40 and 50 operate as follows: solid lines denote the expanded state of the spherical shell 41 or of the cylindrical shell 52 receiving liquid or water vapor. The dashed lines 41' or 52' denote the contracted or shrunk state of the spherical shell 41 or of the cylindrical shell 52 following release of moisture (drying) or water vapor reduction.

Upon expansion of the spherical or the cylindrical shell 41 or 52 caused by receiving liquid or water vapor, the volumes of said shells increase and as a result operational medium passes through the feed conduit 46 and the connecting conduit 45 inside the spherical or the cylindrical shell. The spherical or the cylindrical shell contract on account of liquid release or water vapor reduction, the volume of the spherical or cylindrical shell decreases and as a result the operational medium is expelled out of the spherical or the cylindrical shell through the connecting conduit 45 and the exhaust conduit 47 and is used for doing mechanical work.

Figure 6:
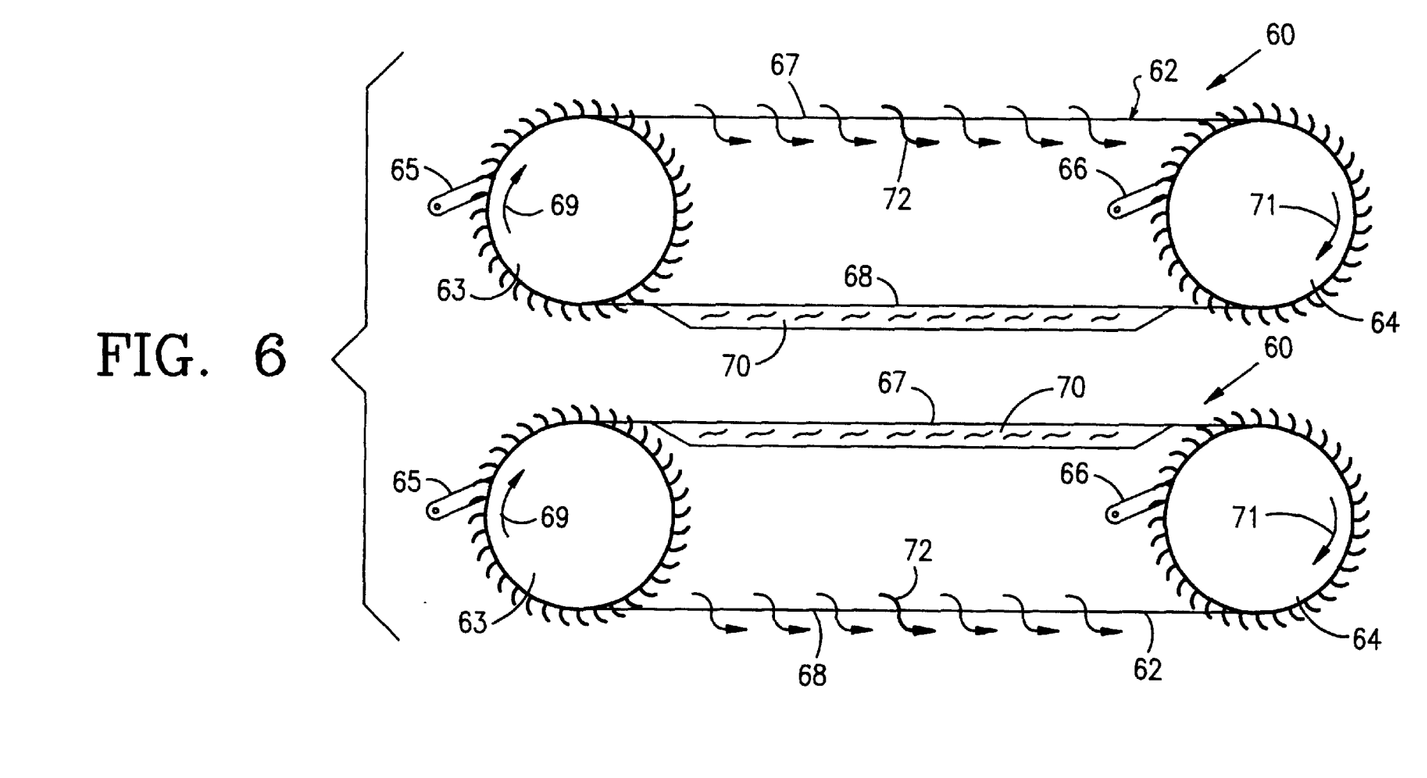
Figure 7:
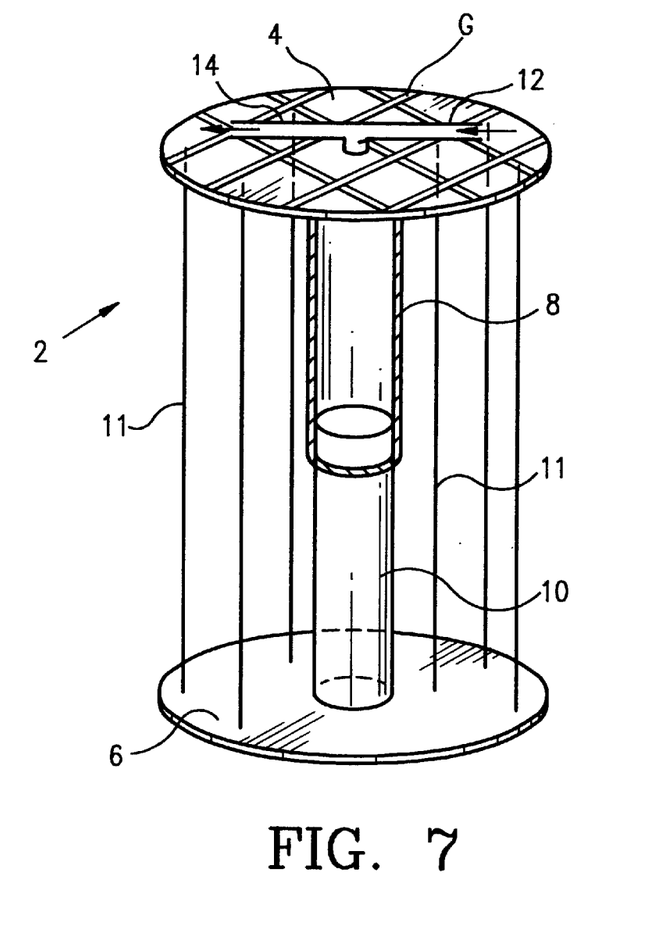
Figure 8:
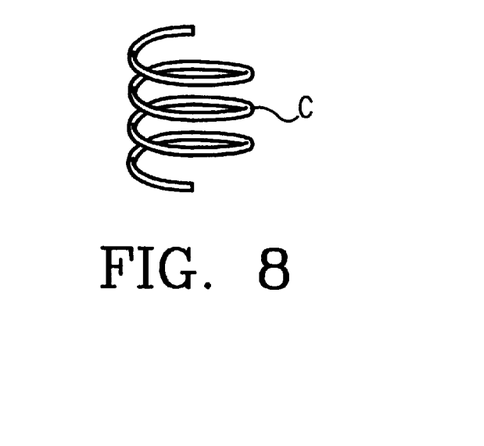

FIG. 6 shows a contraction engine 60 with an endless belt 62 made of an expansible and contractile material and running around two rotatable rollers 63, 64 each set to the same direction by one-way mechanisms 65, 66. Each of the two free belt segments 67, 68 between the rollers is alternatingly moistened (reference 70) and dried (reference 72), the moistening of one belt segment 67 or 68 and the drying of the other belt segment 68 or 67 always being simultaneous. This design allows generating mechanical energy almost continuously. Because of the one-way mechanisms, the rollers are made to rotate in the same direction of the arrows 69, 71 almost continuously.

What is claimed is:

1. A pump, comprising:

a) a rigid first element;

b) a rigid second element, the rigid second element being spaced apart from the first element;

c) a piston and cylinder connecting the first element to the second element, the piston being displaceable relative to the cylinder;

d) at least one of the first and second elements being displaceable in the direction of displacement of the piston relative to the cylinder;

e) an operational element, the operational element being disposed between and operatively connected to the first and second rigid elements;

f) the operational element expanding when absorbing a fluid and contracting when drying out, and the expanding of the operational element causing the first and second plates to move away from each other, thereby causing the piston to be displaced from the cylinder;

g) a fitting operatively connected to the operational element, the fitting being configured for supplying and exhausting at least one of water and water vapor to the operational element;

h) an intake and an exhaust conduit which supplies and removes an operational medium, the intake and exhaust conduit being operatively connected to the piston and cylinder; and i) whereby, when one of water and water vapor is supplied by the fitting to the operational element, the operational element absorbs the one of water and water vapor and the operational element expands, moves the first element and second element apart, displaces the piston relative to the cylinder, and thus sucks the operational medium into the cylinder.

2. A pump as in claim 1, wherein:

a) when one of water and water vapor is removed by the fitting from the operational element, the operational element releases the one of water and water vapor and the operational element contracts, moves the first element and second element together, displaces the piston relative to the cylinder, and thus displaces the operational medium from the piston.

3. A pump as in claim 1, wherein:

a) the rigid first and second elements include plates.

4. A pump as in claim 1, wherein:

a) the rigid first and second elements include plaiting.

5. A pump as in claim 1, wherein:

a) the rigid first and second elements include a fabric material.

6. A pump as in claim 1, wherein:

a) the rigid first and second elements include a lattice.

7. A pump as in claim 1, wherein:

a) the operational element includes a strand.

8. A pump as in claim 1, wherein:

a) the operational element includes a fiber.

9. A pump as in claim 1, wherein:

a) the operational element includes a folded plate.

10. A pump as in claim 1, wherein:

a) the operational element includes a coil.

11. A pump as in claim 1, wherein:

a) the operational element includes a coiled fiber.

12. A pump as in claims 1, wherein:

a) the operational element includes a plurality of operational elements.

13. A pump as in claims 9, wherein:

a) the operational element includes a plurality of folded plates.

14. A pump as in claims 8, wherein:

a) the operational element includes a plurality of fibers.

15. A pump as in claims 7, wherein:

a) the operational element includes a plurality of strands.

* * * * *